United States Patent
Kaufmann

(10) Patent No.: US 6,887,609 B2
(45) Date of Patent: May 3, 2005

(54) FUEL CELL SYSTEM AND METHOD FOR OPERATING THE FUEL CELL SYSTEM

(75) Inventor: Lars Kaufmann, Kirchheim (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 524 days.

(21) Appl. No.: 09/860,509

(22) Filed: May 21, 2001

(65) Prior Publication Data

US 2002/0012893 A1 Jan. 31, 2002

(30) Foreign Application Priority Data

May 19, 2000 (DE) .......................................... 100 24 570

(51) Int. Cl.$^7$ ............................................... H01M 2/02
(52) U.S. Cl. ............................. 429/34; 429/12; 429/13; 429/17; 429/19; 429/72; 429/61; 429/62; 429/63; 429/64; 429/69; 60/39.05; 60/39.12; 60/39.13; 60/39.5; 60/39.511; 60/39.35
(58) Field of Search .............................. 429/12, 13, 17, 429/19, 34, 61–64, 69, 72; 60/39.05, 39.12, 39.13, 39.5, 39.511, 39.35, 39.39, 37.4, 39.461, 722, 723

(56) References Cited

U.S. PATENT DOCUMENTS

| 3,972,731 A | 8/1976 | Bloomfield et al. ...... 136/86 R |
| 4,128,700 A | 12/1978 | Sederquist ................... 429/17 |

2001/0007724 A1 * 7/2001 Takabe et al. ................ 429/22

FOREIGN PATENT DOCUMENTS

| DE | 19755116 | 3/1999 |
| DE | 199 24 938 A1 | 12/1999 |
| DE | 100 07 902 A1 | 8/2000 |
| DE | 19856499 | 10/2000 |
| DE | 19956376 | 6/2001 |
| EP | 0170277 | 7/1985 |
| EP | 1 009 053 A1 | 6/2000 |
| JP | 60195880 | 4/1985 |
| JP | 63239777 | 10/1988 |
| JP | 2000173635 | 6/2000 |
| WO | WO 91/03844 | 3/1991 |
| WO | WO 92/07392 | 4/1992 |

* cited by examiner

Primary Examiner—Randy Gulakowski
Assistant Examiner—Gentle E. Winter
(74) Attorney, Agent, or Firm—Seed IP Law Group PLLC

(57) ABSTRACT

A fuel cell system and method of operation in which the fuel cell system has a fuel cell unit with anode and cathode, a media flow path for supplying substantially pure hydrogen to the anode, a media flow path for the cathode, an anode exhaust-gas flow path and a cathode exhaust-gas flow path. A fan for supplying air to the cathode is provided in the flow path of the cathode, and a catalytic burner is arranged in the cathode exhaust-gas flow path. The anode exhaust-gas flow path opens into the catalytic burner and/or into the cathode exhaust-gas flow path upstream of the catalytic burner. The combined, catalytically converted fuel cell exhaust-gas flow is passed into an expansion machine.

7 Claims, 2 Drawing Sheets

FUEL CELL SYSTEM AND METHOD FOR OPERATING THE FUEL CELL SYSTEM

BACKGROUND AND SUMMARY OF THE INVENTION

This application claims the priority of 100 24 570.6, filed May 19, 2000, the disclosure of which is expressly incorporated by reference herein.

The invention relates to a fuel cell system and a method for operating a fuel cell system.

U.S. Pat. No. 3,972,731 discloses a fuel cell system in which a compressor which is connected to a turbine via a common shaft is used to supply air to the fuel cell cathode. The fuel cell anode is exposed to a hydrogen-rich reformate generated by an endothermic reaction in a steam reformer that is thermally coupled to a catalytic burner. The hot and moist cathode exhaust gas is cooled substantially in a water separator, dehumidified, and then heated again by a catalytic burner arranged in the exhaust system. The heated exhaust gas drives the turbine which is coupled to the compressor.

To supply air to the cathode side, fuel cell systems usually require a compressor. In methanol-operated fuel cell systems, high system pressure is inherently advantageous, for example, to improve the water balance of the system. Furthermore, the efficiency of the fuel cell rises as a result of the higher oxygen partial pressure, and pressure losses in the fuel cell system are minimized.

However, an elevated pressure level is associated with a higher uptake by the compressor, which leads to efficiency losses and, for the same useful power, an increase in the size of the fuel cell system.

One object of the invention is to provide a PEM fuel cell system, and a method for operating such a system, which makes beneficial use of cathode exhaust gas to increase the useful power of the system.

This and other objects and advantages are achieved by the fuel cell system according to the invention, in which the fuel cell unit is preferably operated with pure hydrogen gas. A catalytic burner is arranged in the cathode exhaust-gas flow path, with the anode exhaust-gas flow path opening into the catalytic burner and/or into the cathode exhaust-gas flow path upstream of the catalytic burner. The combined, catalytically converted fuel cell exhaust-gas flow can be introduced at elevated temperature into an expansion machine.

A fuel cell system of this type, in which the fuel cell unit is operated with hydrogen that is as pure as possible, has the advantage that it is possible to work with a low hydrogen excess in the part-load range and increasing the hydrogen excess in the high-load range. In this manner a large quantity of exhaust-gas energy is available.

In a particularly preferred embodiment of the fuel cell unit according to the invention, fuel cell stacks are connected together both in series and in parallel in terms of flow, and the hydrogen excess can be optimized over the part-load range and the full-load range. If the fuel cell unit is operated with pure or highly purified hydrogen, it is ensured that even the last cell or the last fuel cell stack, as seen in the direction of flow, receives hydrogen of sufficient purity.

Other objects, advantages and novel features of the present invention will become apparent from the following detailed description of the invention when considered in conjunction with the accompanying drawings.

DETAILED DESCRIPTION OF THE DRAWINGS

The invention is suitable both for stationary fuel cell systems and for fuel cell installations intended for the operation of vehicles. The invention is particularly advantageous for fuel cell systems which are usually operated at low temperatures, such as for example polymer electrolyte membrane (PEM) fuel cell systems. In PEM fuel cell systems of this type, high temperatures of significantly over 100° C. are usually not available in the system, or are not desirable for reasons of temperature balance.

The invention is advantageous in those fuel cell systems in which the fuel cell unit is supplied with very pure hydrogen gas. A preferred fuel cell system is operated entirely with pure hydrogen gas. (That is, it does not have a gas generation system.) Another preferred fuel cell system has a gas generation system in which hydrogen is generated from an operating medium. The hydrogen is purified by suitable processes, for example by means of palladium membrane processes, and is fed to the fuel cell unit as high-purity hydrogen. The hydrogen which passes into the fuel cell unit is substantially free not only from impurities which damage the catalyst, such as CO, but also impurities such as $N_2$ or $CO_2$ which are usually present in a reformate. Expedient operating media may be substances such as alcohols (for example methanol), natural gas, hydrocarbons (for example gasoline, ethers and the like).

In a first preferred configuration, the fuel cell unit is operated with a load-dependent hydrogen excess.

Figure 1:
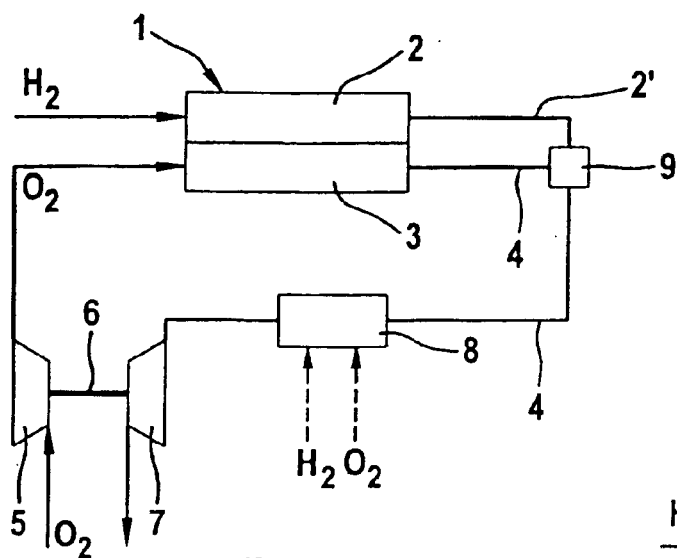
FIG. 1 is a schematic illustration of a preferred fuel cell system according to the invention, with a mixer in the exhaust-gas flow.

FIG. 1 shows a preferred embodiment fuel cell system according to the invention. The fuel cell unit 1 has an anode 2 and a cathode 3. (For the sake of simplicity, the fuel cell unit 1 is illustrated as a single cell, but it may also represent a stack of fuel cells. In particular, a fuel cell unit 1 of this type may be formed by fuel cell stacks which are connected in parallel and/or in series in terms of flow.) The anode 2 is exposed, via a media flow path, to hydrogen $H_2$, for example from a hydrogen reservoir. The exhaust gas from the anode 2 is discharged from the fuel cell unit 1 via an anode exhaust-gas flow path 2'.

A fan 5 is arranged in a media flow path for the cathode 3 and compresses an oxygen-containing medium $O_2$, preferably air, which is fed to the cathode 3 under high pressure. The reaction between oxygen and hydrogen then takes place in the fuel cell unit 1. The anode exhaust-gas flow may be admixed with the cathode exhaust-gas flow in a mixer 9. In the further cathode exhaust-gas flow path 4 there is a catalytic burner 8, in which the cathode exhaust gas and the anode exhaust gas are catalytically burned, and the exhaust-gas temperature of the fuel cell exhaust gas is increased. To this end, additional fuel, for example hydrogen and/or oxygen, may be metered to the catalytic burner 8 via a metering device. This is indicated in the figure by a dashed line with an arrow at the end for each medium.

The hot cathode exhaust gas passes into an expansion machine 7 via the cathode exhaust-gas flow path 4. The expansion machine 7 is preferably coupled to the fan 5, particularly preferably mechanically via a common shaft 6. The preferred expansion machine 7 is a turbine and is able to drive the fan 5 using the energy which has been recovered from the hot exhaust gas.

Figure 2:
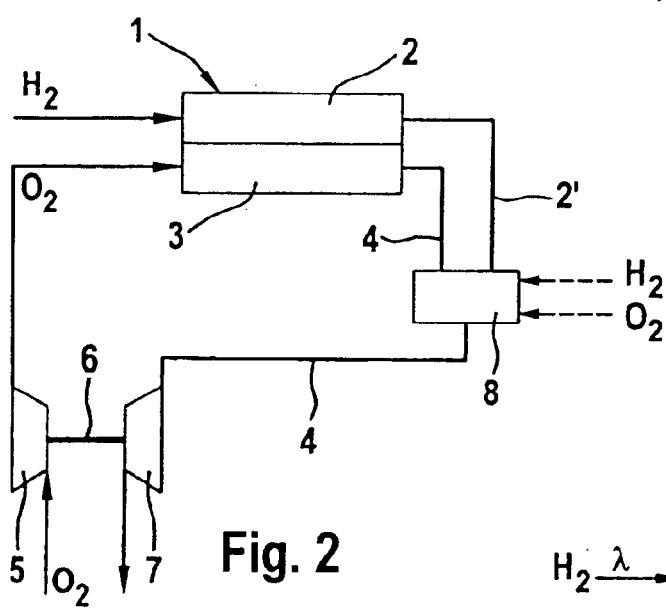
FIG. 2 shows a further preferred embodiment of a fuel cell system without mixer.

FIG. 2 shows a further circuit according to the invention. Identical elements are denoted by the same reference symbols as in FIG. 1.

Hydrogen $H_2$ is fed to an anode 2 of a fuel cell unit 1 via an anode flow path. The cathode 3 is supplied with oxygen-containing medium $O_2$, preferably air, via a media flow path for the cathode 3. This medium is compressed to a desired pressure level in a fan 5, preferably a compressor, arranged in the media flow path and is fed to the cathode 3. (A preferred pressure level is over approximately 2 bar absolute.) The cathode exhaust air is discharged from the cathode 3 in a cathode exhaust-gas flow path 4. Anode exhaust gas from the anode exhaust-gas flow path 2' may be admixed with the cathode exhaust gas in the cathode exhaust-gas flow path 4 or may in each case be fed separately to a catalytic burner 8. At or in the catalytic burner 8, preferably hydrogen-containing fuel may additionally be metered to the mixture via a metering device. A suitable fuel is hydrogen, methanol, gasoline, and/or methane.

The cathode exhaust-gas mixture is heated, as it flows through the catalytic burner 8, to a first high temperature $T_1$, preferably of between 450° C. and 1100° C., (particularly preferably between 150° C. and 1100° C.). The hot medium then passes to an expansion machine 7, preferably a turbocharger, that drives the fan 5 via a coupling 6. The fan 5 may be single-stage or two-stage or multistage. The coupling is preferably effected via a common shaft 6 between fan 5 and expansion machine 7. However, the introduction of the energy recovered from the hot exhaust gas may also take place electrically; in this case a turbo-generator is to be provided.

In the process, the exhaust gas is cooled to a second temperature $T_2$, which is lower than the first temperature $T_1$, the temperature difference $\Delta T$ between the first temperature $T_1$ and the second temperature $T_2$ preferably being between 50° C. and 200° C.

The cooled exhaust gas is discharged from the expansion machine 7. The exhaust-gas energy which is still present may be used in any further heating devices of the system, for example in order to bring media to a suitable operating temperature.

Figure 3:
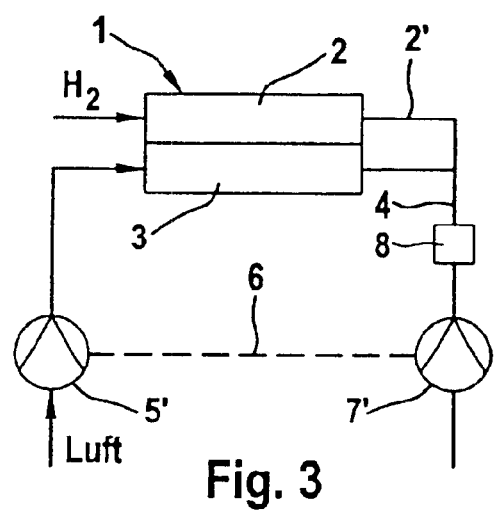
FIG. 3 shows a further preferred embodiment of the fuel cell system according to the invention.

FIG. 3 shows a further preferred embodiment of the invention, in which there is no coupling between fan 5 and expander 7. Identical elements to those shown in FIGS. 1 and 2 are provided with the same reference symbols; the structure corresponds to that described above. Instead of the fan 5, a turboblower 5' is provided in the cathode feed and instead of the expansion machine 7 a turbine with generator 7' is provided in the cathode exhaust-gas flow path 4.

At an elevated exhaust-gas temperature, the expansion machine 7 is able to return a considerable power to the system or to the fan 5. As a result, any electric drive for the fan 5 may be of smaller design than would be the case without the arrangement according to the invention.

If the exhaust-gas temperatures $T_1$, in the catalytic burner 8 are very substantially increased, it is possible to further reduce the fan power required in full-load situations, thus increasing the useful power of the fuel cell system. In this manner, it is possible to reduce both the necessary fuel cell output and the size of the overall system while achieving the same useful power, thereby positively affecting costs, volume and mass of the fuel cell system.

In an extreme design case, the fan/expansion machine unit 5, 7 can even reach a generator mode. That is, the expansion machine 7 generates so much energy that not only can the compression be fully balanced out, but also electrical energy can be output to an electric drive motor of the fan 5. Very high exhaust-gas temperatures, for example of between 600° C. and 1100° C., correspond to this extreme design situation. In this advantageous state, when expansion machine 7 and the fan 5 interact as a generator, the generator increases the useful power of the fuel cell system.

If the fan/expansion machine unit 5, 7 is controlled, the temperature drop of the exhaust gas across the expansion machine 7 is stored by means of a characteristic diagram in a data memory, preferably in a control device, and the metering device for adding fuel to the catalytic burner 8 (for example, a metering valve) is set accordingly in operation.

Preferably, the characteristic diagram gives the temperature drop as a function of the load and the pressure ratio $\Pi$ of the expansion machine 7, where $\Pi$ represents the ratio between the pressure at the expansion-machine inlet and the expansion-machine outlet. The result, for example for a system at full load and with a pressure ratio of $\Pi=2.5–3$, is a temperature drop of, for example, 60° C.–120° C. across the expansion machine 7, depending on the efficiency of the latter.

On account of the high temperatures, the conversion in the catalytic burner 8 (despite fuel metering taking place at that point) is very good. Thus, there is no risk of significant HC emissions if a hydrogen-containing medium other than hydrogen gas (for example, methanol) is added as fuel. On the other hand, the temperature level is sufficiently low that there is no formation of nitrogen oxide.

It is preferable to select a system architecture in which a high temperature level prevails at least at one point in the exhaust system. The expansion machine 7 is expediently placed at this point, and if appropriate the exhaust gas is subsequently cooled. The subsequent pressure losses in the gas flow path should be minimized.

With fuel cell systems, it is customarily desirable for the fuel cell unit 1 in the part-load range to be operated with the lowest possible hydrogen excess. At a hydrogen ratio $\lambda=1$, the same amount of hydrogen is used in the fuel cell as is supplied, so that no hydrogen is included in the anode exhaust gas. On the other hand, to achieve a satisfactory stable reaction, a significant hydrogen excess over the oxygen is required in the cathode 3. Therefore, the fuel cell unit 1 is customarily operated with a hydrogen excess at $\lambda=1.1$ or more. Although, to avoid hydrogen loss at a $\lambda>1$, the anode exhaust gas can be recycled and in this way the hydrogen from the exhaust gas can be reused for reaction in the fuel cell 1. This requires a high degree of system complexity. With an open system, the excess, unused hydrogen would be emitted from the system together with the exhaust gas.

The fuel cell system according to the invention therefore particularly advantageously enables the system to be simplified and enables favourable efficiencies to be achieved at part load and full load even, if a hydrogen excess is used.

The circuit of the exhaust-gas flows means that there is no difference in pressure between cathode 3 and anode 2; rather automatic pressure compensation takes place. The fuel cell system in which the fuel cell unit 1 is operated with hydrogen gas can be operated without recycling of the anode exhaust gas, as a so-called open system, without unused hydrogen from the exhaust gas being lost. There are also no undesirable emissions of hydrogen, since these emissions are converted in the catalytic burner 8. Furthermore, the open operating mode it is impossible for any build-up of inert gases or contaminants to build up in the fuel cell unit 1.

If the fuel cell unit is operated with a load-dependent lambda value for hydrogen, (that is, the hydrogen excess in the fuel cell unit 1 is set in a load-dependent manner), at full load a very high hydrogen excess (for example $\lambda=1.5$, or a hydrogen excess of 50%) can be fed to the anode 2. The temperature of the exhaust gas in the catalytic burner 8 then rises to very high values and supplies a very high level of exhaust-gas energy in the expander part 7 or turbocharger 7', which can advantageously be used to drive the compressor 5.

In conventional systems, the fuel cell unit 1 must be large enough for useful load and compressor power. In a fuel cell system with a 15 kW compressor and a 65 kW useful power, therefore, for example an 80 kW fuel cell unit must be provided. According to the invention, the size of the system can be reduced accordingly, since the compressor power no longer need be taken into account in designing the fuel cell unit 1. Rather, as has been described, this power can be covered by energy from the catalytic burner 8.

For this purpose, at part load, the hydrogen excess may be approximately $\lambda=1.05$ or less, so that only a minimal hydrogen excess has to be used. This is particularly favourable in a pure hydrogen fuel cell system, in which no gas cleaning is required, but may also be used in a system in which pure hydrogen is extracted from the reformate from a gas generation unit. The excess hydrogen, as a result of combustion in the catalytic burner 8, can still supply the exhaust-gas energy for the expander 7 and therefore for driving the compressor 5.

Figure 5:
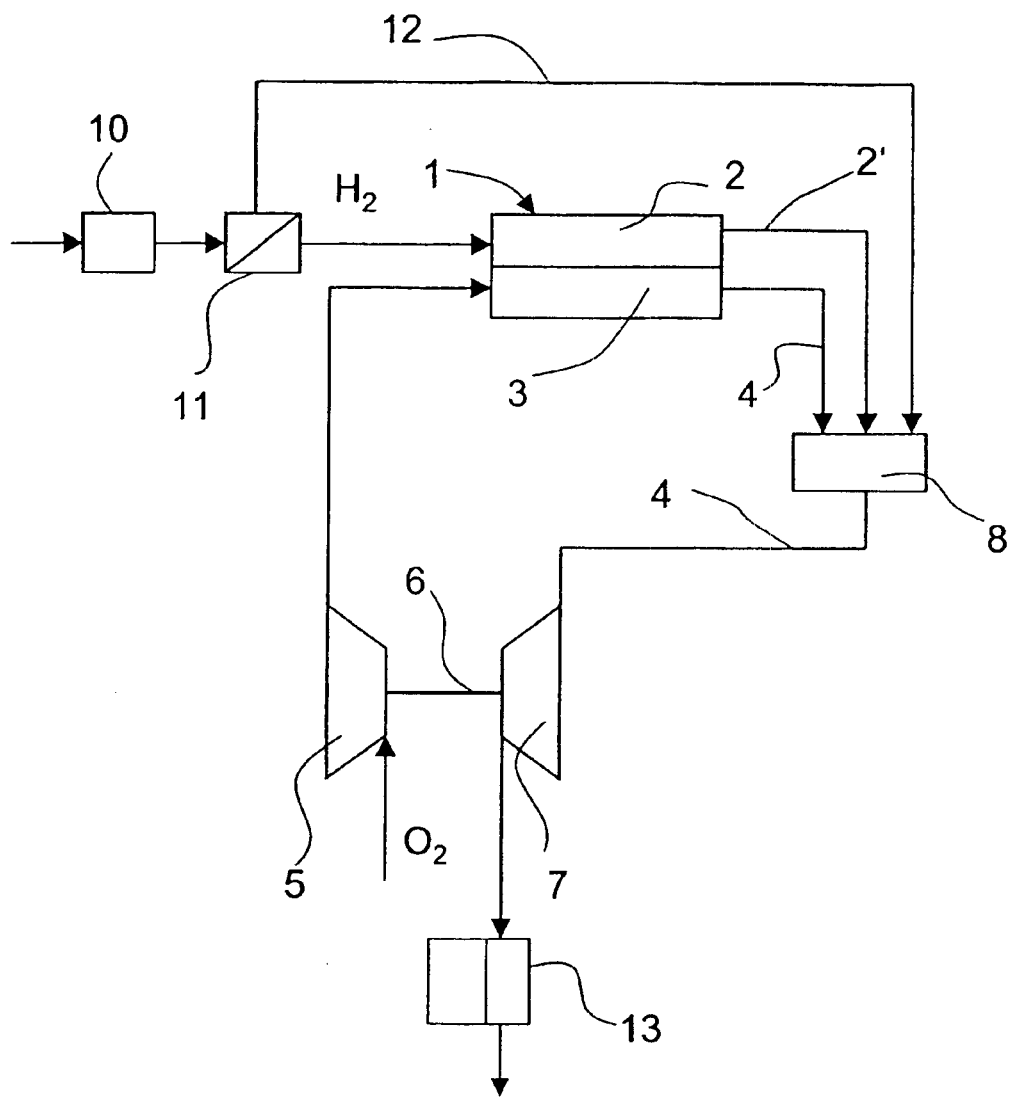
FIG. 5 shows a further preferred embodiment of the fuel cell system according to the invention, with a gas generation system.

FIG. 5 illustrates a further preferred fuel cell system which has a gas generation system with a device 10 for obtaining hydrogen by reforming or partial oxidation of the operating medium, as well as a cleaning unit 11, in order to separate the hydrogen-rich product gas obtained in the device 10 from impurities to the greatest extent possible. Identical elements in the figure are denoted by the same reference symbols as in FIGS. 1, 2 and 3.

In the cleaning unit 11, hydrogen is separated from the hydrogen-rich product gas which emerges from the device 10, preferably via a membrane process or other suitable processes, in which hydrogen can be substantially selectively separated even from inert impurities. In a preferred process, hydrogen diffuses selectively through a palladium membrane and is separated from impurities.

The pure hydrogen obtained in this way is fed to the anode 2 of the fuel cell unit 1. The cathode 3 is once again supplied with oxygen or air by the compressor 5. Anode exhaust gas and cathode exhaust gas are fed to the catalytic burner 8 separately or in mixed form, and other fuel may also be fed to the catalytic burner in addition. The contaminated remainder of the product gas, from which most of the hydrogen has been removed, is particularly advantageously fed as further fuel to the catalytic burner 8.

This is because if a preferred palladium membrane module is used to separate out the hydrogen, typically 20% of the hydrogen remains in the residual gas, while only 80% of the hydrogen is separated out by the palladium membrane and reaches the anode 2. A similar statement also applies to other cleaning processes.

If the fuel cell system is operated, for example, with a hydrogen excess of 20% (i.e., a hydrogen lambda value of $\lambda=1.2$), the residual gas still contains a very large quantity of hydrogen which is lost to the fuel cell unit 1. If a lower hydrogen excess is used, in order to reduce the hydrogen losses (for example $\lambda=1.05$), the membrane module 11 must be made correspondingly large, in order to be able to make sufficient hydrogen available to the anode. Because residual gas is fed to the catalytic burner 8, the hydrogen contained therein can be utilized to good effect in the system.

If a liquid operating medium, such as gasoline or methanol, is used, the heat entrained in the exhaust-gas flow 4 downstream of the catalytic burner 8 and/or downstream of the expansion machine 7 can advantageously be used in an additional heat exchanger 13 for evaporating operating medium and/or water, and/or for reforming the operating medium.

The utilization of the exhaust-gas energy according to the invention therefore allows the current generation system to be smaller than a conventional fuel cell system, since in the event of full load fuel, for example additional methanol can be metered into the catalytic burner 8 and by the generation of high exhaust-gas temperatures across the fan/expansion machine unit 5, 7, it can be directly converted into electrical energy. In this process hydrogen can be utilized highly efficiently overall, on account of the load-dependent setting of the hydrogen excess.

In a particularly expedient embodiment of the invention, hydrogen can be saved as operating medium by an advantageous arrangement of the fuel cell stacks of the fuel cell unit 1, in which the hydrogen is utilized more efficiently. In additional combination with a load-dependent setting of the hydrogen excess during operation of the fuel cell, the hydrogen utilization is improved further.

Preferably, a plurality of fuel cell stacks are connected in parallel (in terms of gas flow) and one or more fuel cell stacks are for this purpose connected in series, in such a manner that the excess hydrogen which is not converted in the upstream parallel circuit of the fuel cell stacks is sufficient to operate the fuel cell stack(s) connected in series therewith. The number of parallel-connected fuel cell stacks and of series-connected fuel cell stacks is selected in such a way that all the fuel cell stacks can be operated with an approximately similar hydrogen excess. The arrangement allows advantageous optimization of the hydrogen consumption.

A conventional fuel cell unit 1 is constructed, for example, from four individual fuel cell stacks through which medium flows in parallel. The size of the stacks depends on the electric voltage and/or power demanded of the fuel cell unit 1. For customary operation, a sufficient hydrogen excess $\lambda$ is to be provided, typically at $\lambda>1.2$.

Figure 4:
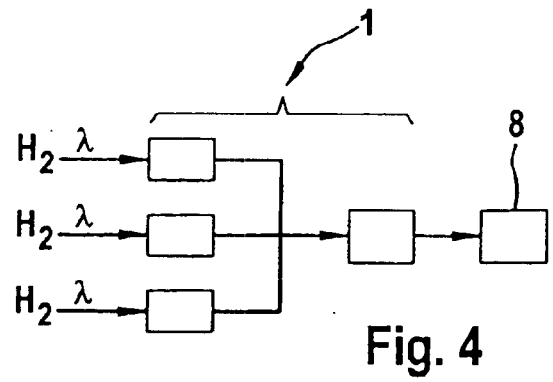
FIG. 4 shows a favourable circuit of individual fuel cell stacks within a single fuel cell unit in a preferred fuel cell system according to the invention.

In an example shown in FIG. 4, three fuel cell stacks are connected in parallel in terms of flow, and one fuel cell stack is arranged in series with these three parallel-connected stacks, so that the exhaust-gas flow from the three upstream fuel cell stacks flows through the fourth fuel cell stack. In this case, the fourth fuel cell stack also receives an excess of hydrogen. The four fuel cell stacks in the figure are denoted overall as fuel cell unit 1.

If the fuel cell unit 1 is to be operated with an overall hydrogen excess of $\lambda=1.1$, an overall hydrogen excess of $4 \times 1.1$, i.e. of $\lambda'=4.4$, is to be provided for four stacks arranged in parallel. However, if only three fuel cell stacks are connected in parallel, and the fourth fuel cell stack is connected in series therewith, each of the three parallel fuel cell stacks, for a nominal $\lambda=1.1$, receives a hydrogen excess of $\lambda=(4.4/3)\approx1.5$, and the fourth fuel cell stack in the exhaust-gas flow receives a similar hydrogen excess of around $\lambda=1.4$.

The hydrogen excess which each individual fuel cell stack arranged in the preferred circuit receives individually is higher than the hydrogen excess of $\lambda=1.1$ with which the fuel cell unit 1 is operated overall. Therefore, the hydrogen excess for the individual fuel cell stacks of the fuel cell unit 1 is effectively increased. The fuel cell unit 1 with the final, fourth cell, as seen in the direction of flow, on the one hand has a hydrogen excess which is similar to or only slightly lower than that of the upstream cells, and on the other hand has a sufficiently clean flow of medium in which the hydrogen is not diluted to an unacceptably great extent by impurities.

In the part-load range, with a very low hydrogen excess of $\lambda=1.05$, this nominally corresponds, with four fuel cell stacks, to $04\times1.05$, so that with three parallel-connected fuel cell stacks the hydrogen excess per fuel cell stack is $\lambda=(4.2/3)=1.4$, and the hydrogen excess in the fourth fuel cell stack, arranged in the exhaust-gas flow of the three fuel cell stacks, is $\lambda=1.2$.

If the fuel cell unit 1 which has been preferably connected in this manner is operated with a load-dependent hydrogen excess (for example a high excess at full load and a low excess at part load), the parallel and series connection of the fuel cell stacks described makes it possible to ensure that each individual fuel cell stack in the fuel cell unit 1 nevertheless receives a significantly higher hydrogen excess.

The fuel cell unit 1 may also be formed from a greater or smaller number of fuel cell stacks. In this case, it is expedient that at least two fuel cell stacks are connected in parallel, in terms of flow, with at least one further fuel cell stack arranged in series, in terms of flow, with the two fuel cell stacks in the exhaust-gas flow of the at least two fuel cell stacks. This further fuel cell stack is operated with the hydrogen excess from the upstream cells.

In combination with the catalytic burner 8 in the exhaust-gas flow and the recovery of the exhaust-gas energy, it is advantageously possible to reduce the hydrogen consumption of the fuel cell unit 1 and, at the same time, for the fuel cell unit 1 to be of smaller design.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a fuel cell system having a fuel cell unit with an anode and a cathode, a media flow path leading to the anode, a media flow path leading to the cathode, an anode exhaust-gas flow path, a cathode exhaust-gas flow path, a fan inserted in the media flow path leading to the cathode for supplying air to the cathode, and a catalytic burner arranged in the cathode exhaust-gas flow path, said method comprising:

introducing an anode exhaust gas into, and mixing the anode exhaust gas with a cathode exhaust gas in, at least one of the catalytic burner and the cathode exhaust-gas flow path upstream of the catalytic burner;

converting the anode exhaust gas and the cathode exhaust gas into a combined catalytically converted fuel cell exhaust flow in the catalytic burner, passing the combined catalytically converted fuel cell exhaust flow from the catalytic burner into an expansion machine; and feeding the fuel cell unit with a lower excess of hydrogen in part-load operation than in full-load operation.

2. The method according to claim 1, wherein the fuel cell unit is fed with a hydrogen excess of at most 10% in part-load operation, and is fed with a hydrogen excess of at least 20% in full-load operation.

3. The method according to claim 1, wherein one of the cathode exhaust gas and the anode exhaust gas, is heated to a first temperature of between 150° C. and 1100° C. in the catalytic burner.

4. The method according to claim 1, wherein a fuel is metered to the catalytic burner for combustion of the cathode exhaust gas.

5. The method according to claim 4, wherein metering of the fuel into the catalytic burner is controlled based on data from a characteristic diagram of a control device, which diagram includes a temperature drop of the cathode exhaust gas across the expansion machine as a function of a pressure ratio of the expansion machine.

6. The method according to claim 5, wherein the cathode exhaust gas is heated in the catalytic burner to a high temperature at which the expansion machine and the fan interact as a generator, whereby the generator increases the useful power of the fuel cell system.

7. The method according to claim 1, wherein:

the fuel cell system comprises a plurality of the fuel cell unit arranged into a plurality of fuel cell stacks;

at least two fuel cell stacks are connected in parallel in terms of flow; and at least one fuel cell stack is arranged in series in terms of flow with the at least two fuel cell stacks connected in parallel.

* * * * *